US012632182B2

(12) United States Patent
Yan

(10) Patent No.: US 12,632,182 B2
(45) Date of Patent: May 19, 2026

(54) MEMORY MANAGEMENT METHOD, MEMORY STORAGE DEVICE AND MEMORY CONTROL CIRCUIT UNIT

(71) Applicant: PHISON ELECTRONICS CORP., Miaoli (TW)

(72) Inventor: Horng-Sheng Yan, Penghu County (TW)

(73) Assignee: PHISON ELECTRONICS CORP., Miaoli (TW)

( * ) Notice: Subject to any disclaimer, the term of this patent is extended or adjusted under 35 U.S.C. 154(b) by 0 days.

(21) Appl. No.: 18/731,352

(22) Filed: Jun. 3, 2024

(65) Prior Publication Data

US 2025/0355564 A1 Nov. 20, 2025

(30) Foreign Application Priority Data

May 15, 2024 (TW) .................................. 113118011

(51) Int. Cl.
*G06F 3/06* (2006.01)

(52) U.S. Cl.
CPC .......... *G06F 3/0613* (2013.01); *G06F 3/0659* (2013.01); *G06F 3/0679* (2013.01)

(58) Field of Classification Search
CPC ..... G06F 3/0613; G06F 3/0659; G06F 3/0679
See application file for complete search history.

(56) References Cited

U.S. PATENT DOCUMENTS

| 2014/0372667 | A1* | 12/2014 | Tan ..................... | G06F 11/1048 |
| | | | | 711/103 |
| 2019/0196903 | A1* | 6/2019 | Yeh ....................... | G06F 3/0679 |
| 2022/0076755 | A1* | 3/2022 | Kim ........................ | G11C 8/12 |

* cited by examiner

*Primary Examiner* — Eric Cardwell
(74) *Attorney, Agent, or Firm* — JCIPRNET

(57) ABSTRACT

A memory management method, a memory storage device, and a memory control circuit unit are disclosed. The memory management method includes: writing first data into N super physical programming units of a first super physical erasing unit in a plurality of super physical erasing units; generating N first temporary parity codes according to the first data and storing the N first temporary parity codes in a buffer memory; writing second data into M super physical programming units of a second super physical erasing unit in the plurality of super physical erasing units; performing an encoding operation on the second data and the N first temporary parity codes to generate N first parity codes; and writing the N first parity codes into the second super physical erasing unit.

21 Claims, 8 Drawing Sheets

SBD { SB0, SB1

SB1

SB0

Program Sequence: 1 2 3 4 5 6

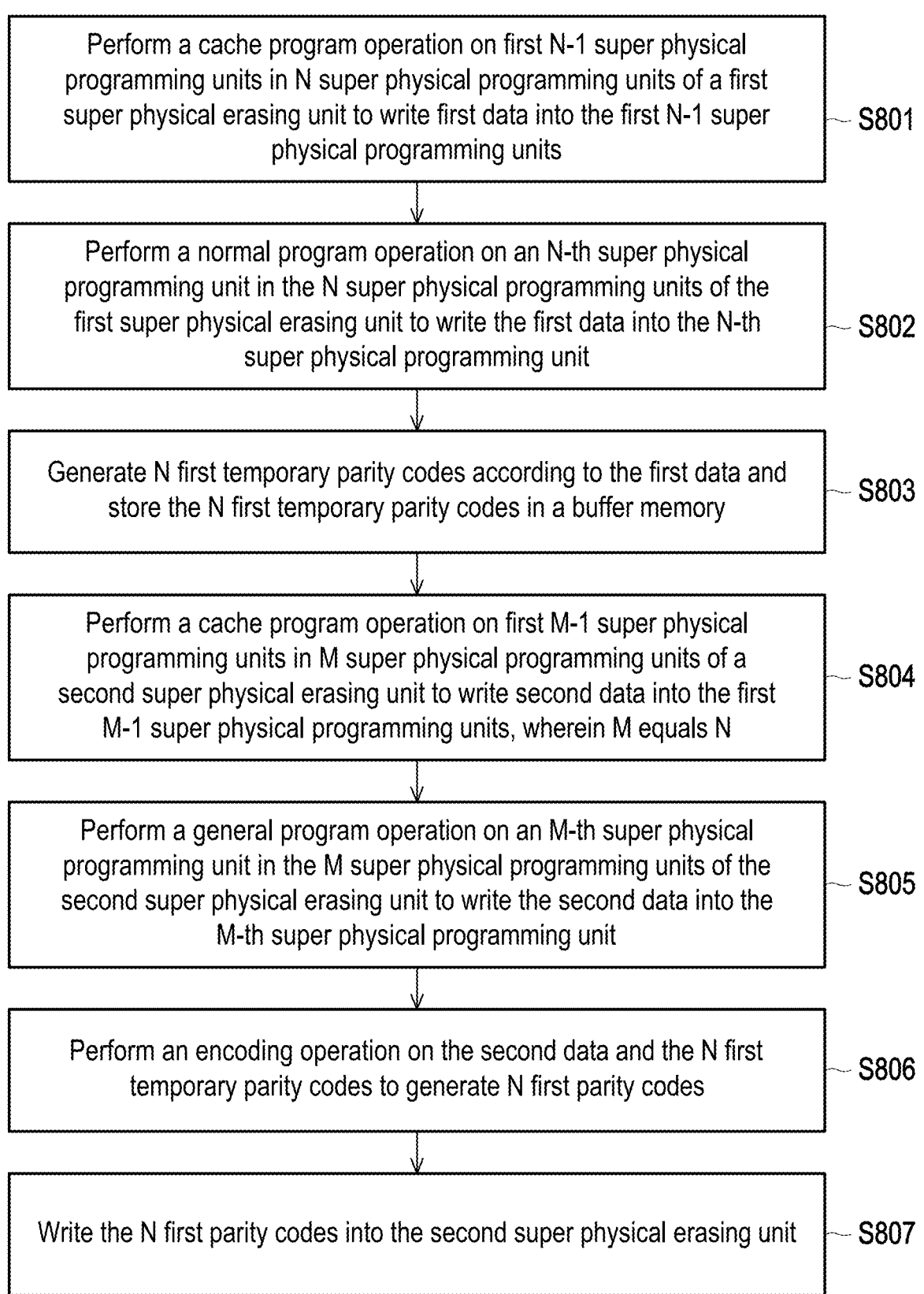

Perform a cache program operation on first N-1 super physical programming units in N super physical programming units of a first super physical erasing unit to write first data into the first N-1 super physical programming units — S801

Perform a normal program operation on an N-th super physical programming unit in the N super physical programming units of the first super physical erasing unit to write the first data into the N-th super physical programming unit — S802

Generate N first temporary parity codes according to the first data and store the N first temporary parity codes in a buffer memory — S803

Perform a cache program operation on first M-1 super physical programming units in M super physical programming units of a second super physical erasing unit to write second data into the first M-1 super physical programming units, wherein M equals N — S804

Perform a general program operation on an M-th super physical programming unit in the M super physical programming units of the second super physical erasing unit to write the second data into the M-th super physical programming unit — S805

Perform an encoding operation on the second data and the N first temporary parity codes to generate N first parity codes — S806

Write the N first parity codes into the second super physical erasing unit — S807

FIG. 8

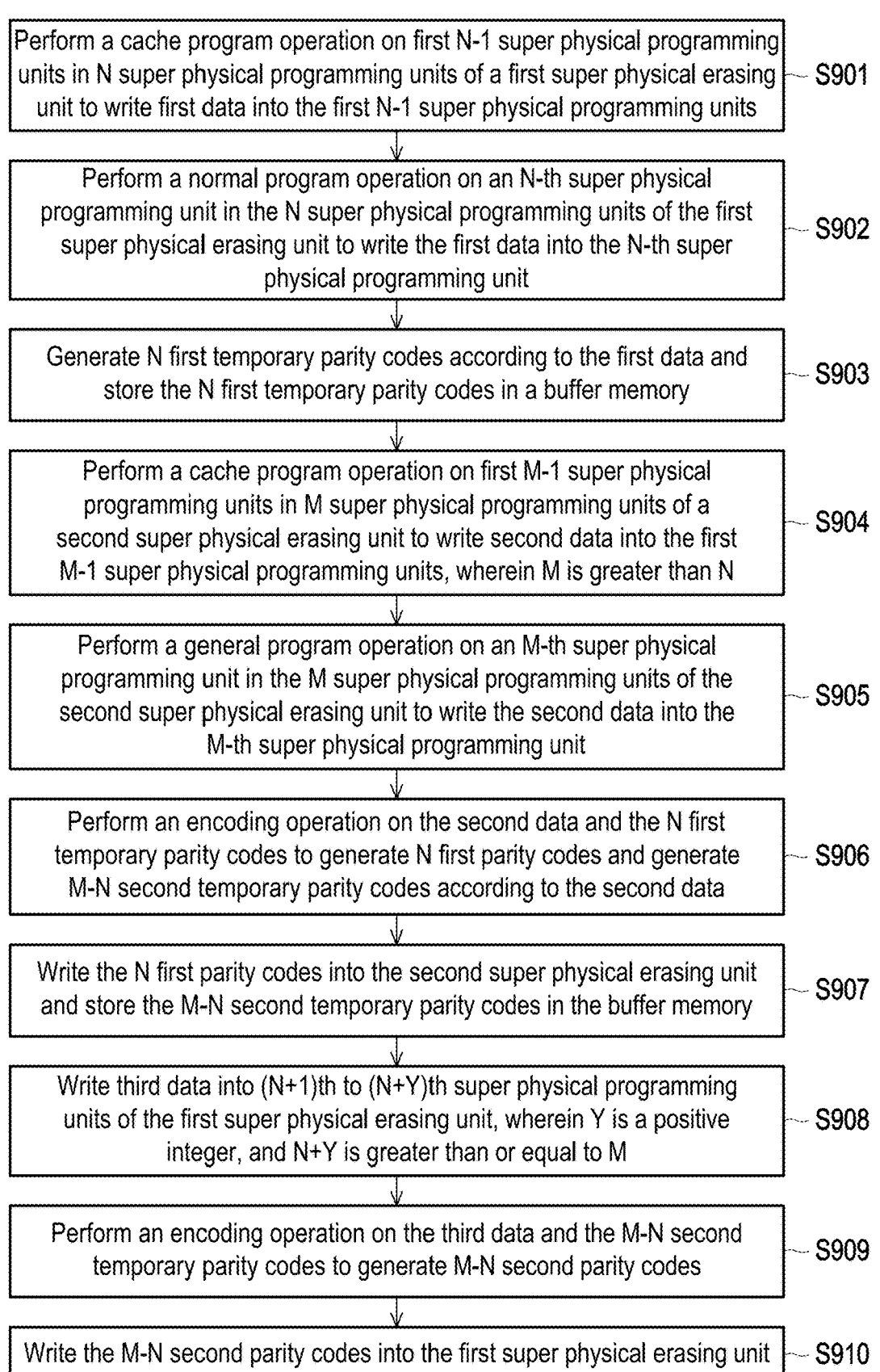

Perform a cache program operation on first N-1 super physical programming units in N super physical programming units of a first super physical erasing unit to write first data into the first N-1 super physical programming units — S901

Perform a normal program operation on an N-th super physical programming unit in the N super physical programming units of the first super physical erasing unit to write the first data into the N-th super physical programming unit — S902

Generate N first temporary parity codes according to the first data and store the N first temporary parity codes in a buffer memory — S903

Perform a cache program operation on first M-1 super physical programming units in M super physical programming units of a second super physical erasing unit to write second data into the first M-1 super physical programming units, wherein M is greater than N — S904

Perform a general program operation on an M-th super physical programming unit in the M super physical programming units of the second super physical erasing unit to write the second data into the M-th super physical programming unit — S905

Perform an encoding operation on the second data and the N first temporary parity codes to generate N first parity codes and generate M-N second temporary parity codes according to the second data — S906

Write the N first parity codes into the second super physical erasing unit and store the M-N second temporary parity codes in the buffer memory — S907

Write third data into (N+1)th to (N+Y)th super physical programming units of the first super physical erasing unit, wherein Y is a positive integer, and N+Y is greater than or equal to M — S908

Perform an encoding operation on the third data and the M-N second temporary parity codes to generate M-N second parity codes — S909

Write the M-N second parity codes into the first super physical erasing unit — S910

FIG. 9

MEMORY MANAGEMENT METHOD, MEMORY STORAGE DEVICE AND MEMORY CONTROL CIRCUIT UNIT

CROSS-REFERENCE TO RELATED APPLICATION

This application claims the priority benefit of Taiwan application serial no. 113118011, filed on May 15, 2024. The entirety of the above-mentioned patent application is hereby incorporated by reference herein and made a part of this specification.

BACKGROUND OF THE INVENTION

Field of the Invention

The invention relates to a memory management technique, and more particularly, to a memory management method, a memory storage device, and a memory control circuit unit.

Description of Related Art

Portable electronic devices such as mobile phones and notebook computers have grown rapidly in the past few years, which has led to a rapid increase in consumer demand for storage media. Since a rewritable non-volatile memory module (such as a flash memory) has characteristics such as data non-volatility, power-saving, small size, and lack of mechanical structures, the rewritable non-volatile memory module is very suitable to be built into the various portable electronic devices provided above.

Generally, a memory storage device may utilize a Redundant Array of Independent Nodes (RAIN) technique to maintain data integrity. However, as the number of physical erasing units of the memory storage device is decreased (i.e., the number of physical programming units in each physical erasing unit is increased), using the parity code ratio of the conventional RAIN technique causes an insufficient number of valid physical erasing units (number of valid blocks, NVB), resulting in inability to meet product specifications.

A plurality of (for example, 16) physical erasing units included in a super physical erasing unit respectively belonging to 4 different memory physical planes of 4 different memory dies is taken as an example for illustration. The conventional RAIN technique adopts a set of parity codes to protect 16 physical erasing units of one super physical erasing unit, that is, the ratio of data to parity codes is 15 to 1. For example, when a program operation is performed, a parity code configured to protect the data may be generated according to the data being written at the same time, and the generated parity code needs to be stored in one of the 16 physical erasing units, reducing the storage space by $\frac{1}{16}$.

SUMMARY OF THE INVENTION

The invention provides a memory management method, a memory storage device, and a memory control circuit unit that may reduce the capacity needed to store parity codes and increase the write rate of the memory storage device.

An exemplary embodiment of the invention provides a memory management method for a rewritable non-volatile memory module, wherein the rewritable non-volatile memory module includes a plurality of super physical erasing units, and the memory management method includes: writing first data into N super physical programming units of a first super physical erasing unit in the plurality of super physical erasing units; generating N first temporary parity codes according to the first data and storing the N first temporary parity codes in a buffer memory; writing second data into M super physical programming units of a second super physical erasing unit in the plurality of super physical erasing units; performing an encoding operation on the second data and the N first temporary parity codes to generate N first parity codes; and storing the N first parity codes in the second super physical erasing unit.

In an exemplary embodiment of the invention, N and M are positive integers, and M is equal to N.

In an exemplary embodiment of the invention, N and M are positive integers, and M is greater than N.

In an exemplary embodiment of the invention, the memory management method further includes: generating M−N second temporary parity codes according to the second data and storing the M−N second temporary parity codes in the buffer memory.

In an exemplary embodiment of the invention, the memory management method further includes: writing third data into (N+1)th to (N+Y)th super physical programming units of the first super physical erasing unit, wherein Y is a positive integer and N+Y is greater than or equal to M; performing an encoding operation on the third data and the M−N second temporary parity codes to generate M−N second parity codes; and writing the M−N second parity codes into the first super physical erasing unit.

In an exemplary embodiment of the invention, values of N and M are associated with a capacity of the buffer memory.

In an exemplary embodiment of the invention, the step of writing the first data into the N super physical programming units of the first super physical erasing unit in the plurality of super physical erasing units includes: performing a cache program operation on first N−1 super physical programming units in the N super physical programming units to write the first data into the first N−1 super physical programming units; and performing a normal program operation on an N-th super physical programming unit in the N super physical programming units to write the first data into the N-th super physical programming unit.

In an exemplary embodiment of the invention, the step of writing the second data into the M super physical programming units of the second super physical erasing unit in the plurality of super physical erasing units includes: performing a cache program operation on first M−1 super physical programming units in the M super physical programming units to write the second data into the first M−1 super physical programming units; and performing a normal program operation on an M-th super physical programming unit in the M super physical programming units to write the second data into the M-th super physical programming unit.

An exemplary embodiment of the invention further provides a memory storage device, including a connection interface unit, a rewritable non-volatile memory module, and a memory control circuit unit. The connection interface unit is configured to be coupled to a host system. The memory control circuit unit is coupled to the connection interface unit and the rewritable non-volatile memory module. The rewritable non-volatile memory module includes a plurality of super physical erasing units, wherein the memory control circuit unit is configured to: write first data into N super physical programming units of a first super physical erasing unit in the plurality of super physical erasing units; generate N first temporary parity codes according to the first data and store the N first temporary parity codes in a buffer memory; write second data into M super physical programming units of a second super physical erasing unit in the plurality of super physical erasing units; perform an encoding operation on the second data and the N first temporary parity codes to generate N first parity codes; and store the N first parity codes in the second super physical erasing unit.

In an exemplary embodiment of the invention, the memory control circuit unit is further configured to: generate M−N second temporary parity codes according to the second data and store the M−N second temporary parity codes in the buffer memory.

In an exemplary embodiment of the invention, the memory control circuit unit is further configured to: write third data into (N+1)th to (N+Y)th super physical programming units of the first super physical erasing unit, wherein Y is a positive integer and N+Y is greater than or equal to M; perform an encoding operation on the third data and the M−N second temporary parity codes to generate M−N second parity codes; and write the M−N second parity codes into the first super physical erasing unit.

In an exemplary embodiment of the invention, the operation of the memory control circuit unit writing the first data into the N super physical programming units of the first super physical erasing unit in the plurality of super physical erasing units includes: performing a cache program operation on first N−1 super physical programming units in the N super physical programming units to write the first data into the first N−1 super physical programming units; and performing a normal program operation on an N-th super physical programming unit in the N super physical programming units to write the first data into the N-th super physical programming unit.

In an exemplary embodiment of the invention, the operation of the memory control circuit unit writing the second data into the M super physical programming units of the second super physical erasing unit in the plurality of super physical erasing units includes: performing a cache program operation on first M−1 super physical programming units in the M super physical programming units to write the second data into the first M−1 super physical programming units; and performing a normal program operation on an M-th super physical programming unit in the M super physical programming units to write the second data into the M-th super physical programming unit.

An exemplary embodiment of the invention also provides a memory control circuit unit configured to control a rewritable non-volatile memory module, wherein the rewritable non-volatile memory module includes a plurality of super physical erasing units. The memory control circuit unit includes a host interface, a memory interface, a memory management circuit, and a buffer memory. The host interface is coupled to a host system. The memory interface is coupled to the rewritable non-volatile memory module. The memory management circuit is coupled to the host interface and the memory interface. The buffer memory is coupled to the memory management circuit, wherein the memory management circuit is configured to: write first data into N super physical programming units of a first super physical erasing unit in the plurality of super physical erasing units; generate N first temporary parity codes according to the first data and store the N first temporary parity codes in a buffer memory; write second data into M super physical programming units of a second super physical erasing unit in the plurality of super physical erasing units; perform an encoding operation on the second data and the N first temporary parity codes to generate N first parity codes; and store the N first parity codes in the second super physical erasing unit.

In an exemplary embodiment of the invention, the memory management circuit is further configured to: generate M−N second temporary parity codes according to the second data and store the M−N second temporary parity codes in the buffer memory. In an exemplary embodiment of the invention, the memory management circuit is further configured to: write third data into (N+1)th to (N+Y)th super physical programming units of the first super physical erasing unit, wherein Y is a positive integer and N+Y is greater than or equal to M; perform an encoding operation on the third data and the M−N second temporary parity codes to generate M−N second parity codes; and write the M−N second parity codes into the first super physical erasing unit.

In an exemplary embodiment of the invention, the operation of the memory management circuit writing the first data into the N super physical programming units of the first super physical erasing unit in the plurality of super physical erasing units includes: performing a cache program operation on first N−1 super physical programming units in the N super physical programming units to write the first data into the first N−1 super physical programming units; and performing a normal program operation on an N-th super physical programming unit in the N super physical programming units to write the first data into the N-th super physical programming unit.

In an exemplary embodiment of the invention, the operation of the memory management circuit writing the second data into the M super physical programming units of the second super physical erasing unit in the plurality of super physical erasing units includes: performing a cache program operation on first M−1 super physical programming units in the M super physical programming units to write the second data into the first M−1 super physical programming units; and performing a normal program operation on an M-th super physical programming unit in the M super physical programming units to write the second data into the M-th super physical programming unit.

Based on the above, the memory management method, the memory storage device, and the memory control circuit unit of the invention may reduce the capacity of the rewritable non-volatile memory module configured to store parity codes by temporarily storing the parity codes in the buffer memory, and increase the range of cache program operation that may be used in the super physical erasing unit to improve the performance of the memory storage device.

BRIEF DESCRIPTION OF THE DRAWINGS

FIG. 8 is a flowchart of a memory management method shown according to an exemplary embodiment of the invention.

FIG. 9 is a flowchart of a memory management method shown according to an exemplary embodiment of the invention.

DESCRIPTION OF THE EMBODIMENTS

In general, a memory storage device (also referred to as a memory storage system) includes a rewritable non-volatile memory module and a controller (also referred to as a control circuit). The memory storage device may be used with a host system, such that the host system may write data into the memory storage device or read data from the memory storage device.

Figure 1:
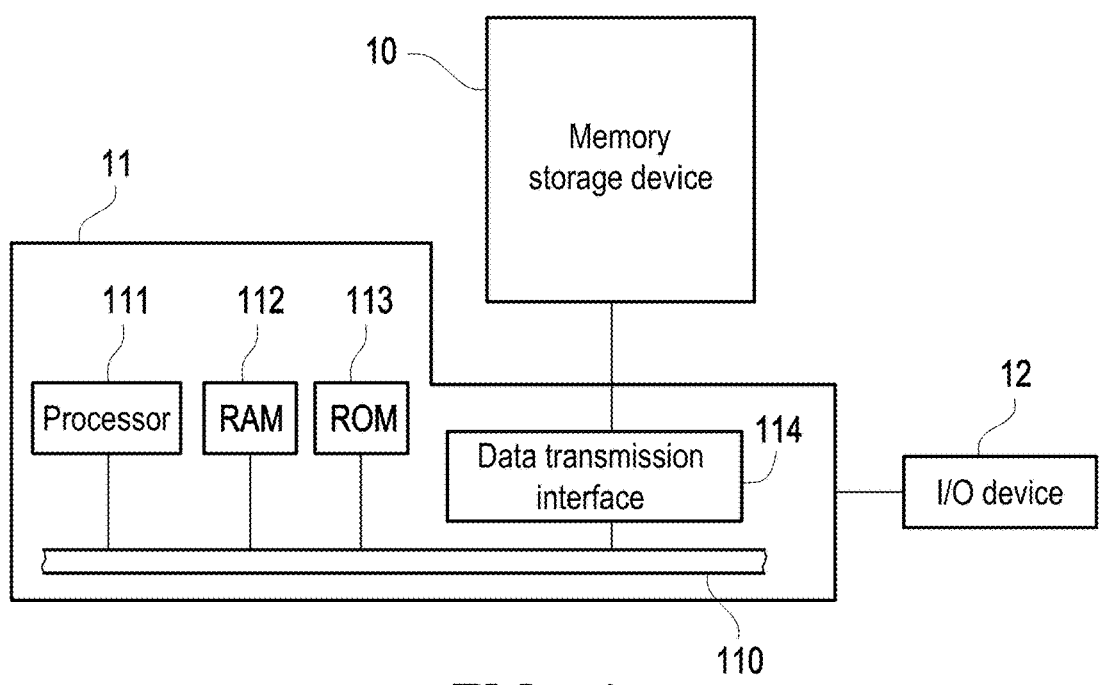
FIG. 1 is a schematic diagram of a host system, a memory storage device, and an input/output (I/O) device shown according to an exemplary embodiment of the invention.
Figure 2:
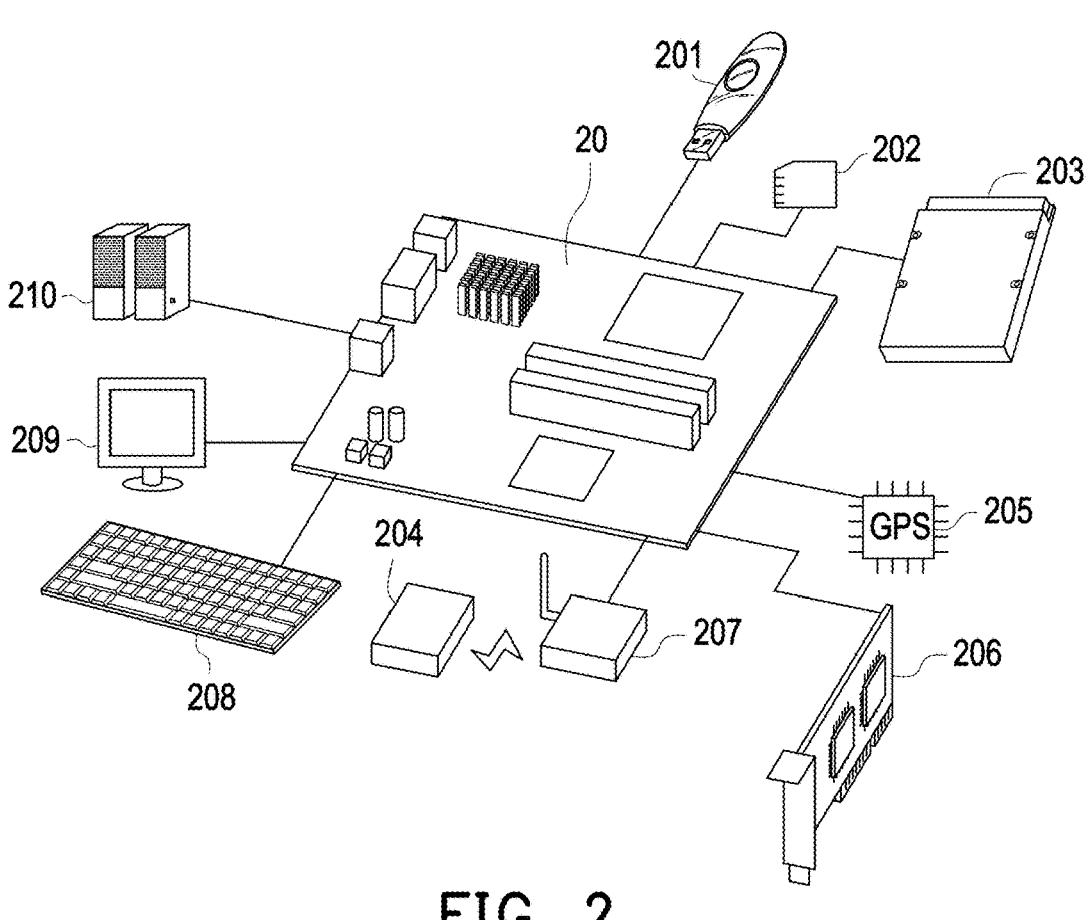
FIG. 2 is a schematic diagram of a host system, a memory storage device, and an I/O device shown according to an exemplary embodiment of the invention.

FIG. 1 is a schematic diagram of a host system, a memory storage device, and an input/output (I/O) device shown according to an exemplary embodiment of the invention. FIG. 2 is a schematic diagram of a host system, a memory storage device, and an I/O device shown according to an exemplary embodiment of the invention.

Referring to FIG. 1 and FIG. 2, a host system 11 may include a processor 111, a random-access memory (RAM) 112, a read-only memory (ROM) 113, and a data transmission interface 114. The processor 111, the RAM 112, the ROM 113, and the data transmission interface 114 may be coupled to a system bus 110.

In an exemplary embodiment, the host system 11 may be coupled to the memory storage device 10 via the data transmission interface 114. For example, the host system 11 may store data in the memory storage device 10 or read data from the memory storage device 10 via the data transmission interface 114. Moreover, the host system 11 may be coupled to the I/O device 12 via the system bus 110. For example, the host system 11 may send an output signal to the I/O device 12 or receive an input signal from the I/O device 12 via the system bus 110.

In an exemplary embodiment, the processor 111, the RAM 112, the ROM 113, and the data transmission interface 114 may be disposed on a motherboard 20 of the host system 11. The quantity of the data transmission interface 114 may be one or a plurality. The motherboard 20 may be coupled to the memory storage device 10 in a wired or wireless manner via the data transmission interface 114.

In an exemplary embodiment, the memory storage device 10 may be, for example, a flash drive 201, a memory card 202, a solid-state drive (SSD) 203, or a wireless memory storage device 204. The wireless memory storage device 204 may be, for example, a memory storage device based on various wireless communication techniques such as a near-field communication (NFC) memory storage device, a wireless fax (WiFi) memory storage device, a Bluetooth memory storage device, or a low-power Bluetooth memory storage device (such as iBeacon). Moreover, the motherboard 20 may also be coupled to various I/O devices such as a global positioning system (GPS) module 205, a network interface card 206, a wireless transmission device 207, a keyboard

208, a screen 209, or a speaker 210 via the system bus 110. For example, in an exemplary embodiment, the motherboard 20 may access the wireless memory storage device 204 via the wireless transmission device 207.

In an exemplary embodiment, the host system 11 is a computer system. In an exemplary embodiment, the host system 11 may be any system that may substantially store data with the memory storage device. In an exemplary embodiment, the memory storage device 10 and the host system 11 may respectively include a memory storage device 30 and a host system 31 of FIG. 3.

Figure 3:
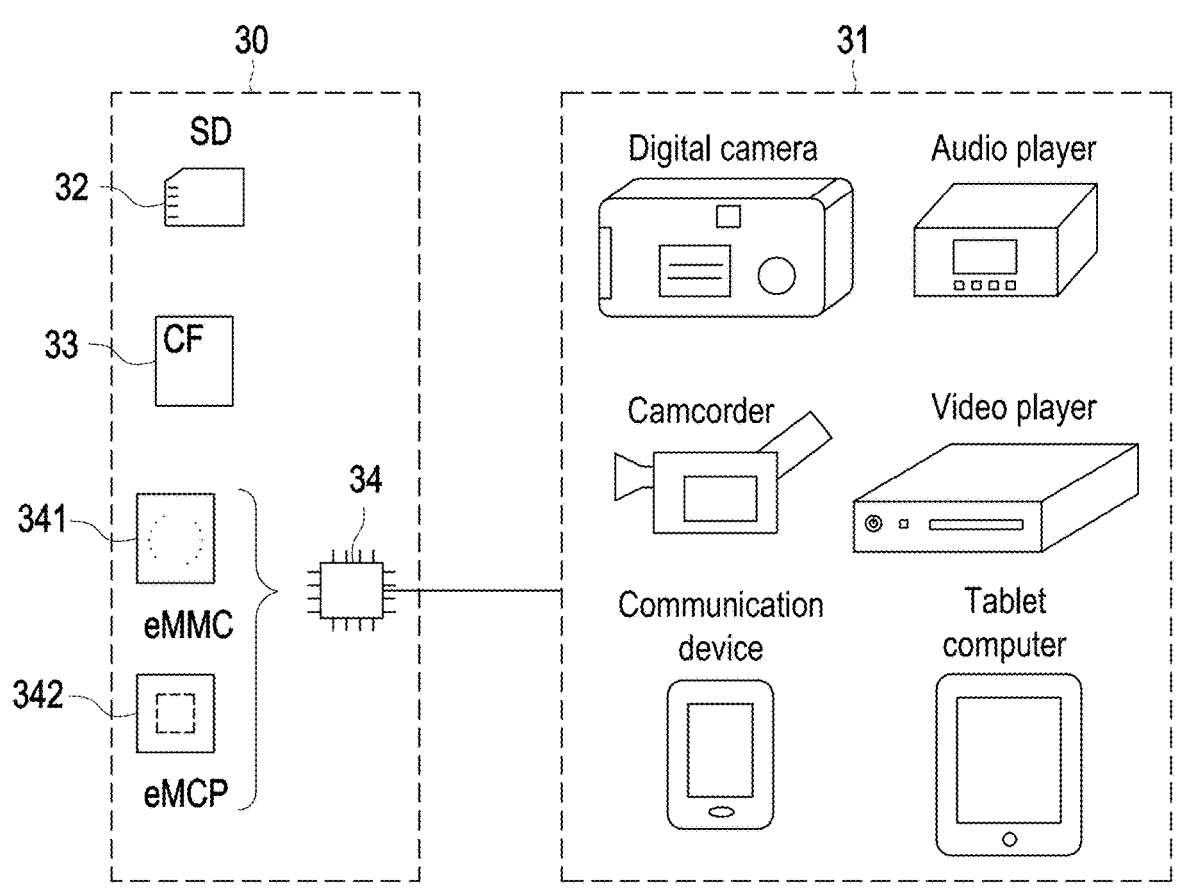
FIG. 3 is a schematic diagram of a host system and a memory storage device shown according to an exemplary embodiment of the invention.

FIG. 3 is a schematic diagram of a host system and a memory storage device shown according to an exemplary embodiment of the invention. Referring to FIG. 3, the memory storage device 30 may be used in conjunction with the host system 31 to store data. For example, the host system 31 may be a system such as a digital camera, a camcorder, a communication device, an audio player, a video player, or a tablet computer. For example, the memory storage device 30 may be various non-volatile memory storage devices such as a Secure Digital (SD) card 32, a Compact Flash (CF) card 33, or an embedded storage device 34 used by the host system 31. The embedded storage device 34 includes various types of embedded storage devices for which a memory module is directly coupled on the substrate of the host system, such as an embedded multimedia card (eMMC) 341 and/or an embedded multi-chip package (eMCP) storage device 342.

Figure 4:
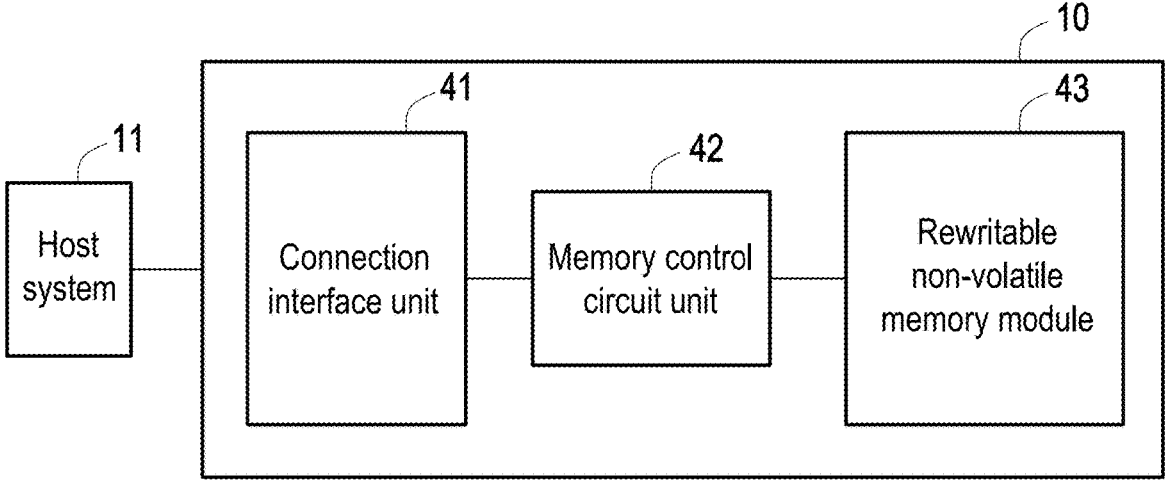
FIG. 4 is a schematic block diagram of a memory storage device shown according to an exemplary embodiment of the invention.

FIG. 4 is a schematic block diagram of a memory storage device shown according to an exemplary embodiment of the invention. Referring to FIG. 4, the memory storage device 10 includes a connection interface unit 41, a memory control circuit unit 42, and a rewritable non-volatile memory module 43.

The connection interface unit 41 is configured to be coupled to the host system 11. The memory storage device 10 may be communicated with the host system 11 via the connection interface unit 41. In an exemplary embodiment, the connection interface unit 41 is compatible with the Peripheral Component Interconnect Express (PCI Express) standard. In an exemplary embodiment, the connection interface unit 41 may also conform to Serial Advanced Technology Attachment (SATA) standard, Parallel Advanced Technology Attachment (PATA) standard, Institute of Electrical and Electronic Engineers (IEEE) 1394 standard, Universal Serial Bus (USB) standard, SD interface standard, Ultra High Speed-I (UHS-I) interface standard, Ultra High Speed-II (UHS-II) interface standard, Memory Stick (MS) interface standard, MCP interface standard, MMC interface standard, eMMC interface standard, Universal Flash Storage (UFS) interface standard, eMCP interface standard, CF interface standard, Integrated Device Electronics (IDE) standard, or other suitable standards. The connection interface unit 41 may be sealed in a chip with the memory control circuit unit 42. Alternatively, the connection interface unit 41 is disposed outside of a chip containing the memory control circuit unit 42.

The memory control circuit unit 42 is coupled to the connection interface unit 41 and the rewritable non-volatile memory module 43. The memory control circuit unit 42 is configured to perform a plurality of logic gates or control commands implemented in a hardware form or in a firmware form. The memory control circuit unit 42 also performs an operation such as writing, reading, and erasing data in the rewritable non-volatile memory storage module 43 according to the commands of the host system 11.

The rewritable non-volatile memory module 43 is configured to store the data written by the host system 11. The rewritable non-volatile memory module 43 may include a single-level cell (SLC) NAND-type flash memory module (that is, a flash memory module that may store 1 bit in one memory cell), a multi-level cell (MLC) NAND-type flash memory module (that is, a flash memory module that may store 2 bits in one memory cell), a triple-level cell (TLC) NAND-type flash memory module (i.e., a flash memory module that may store 3 bits in one memory cell), a quad-level cell (QLC) NAND-type flash memory module (that is, a flash memory module that may store 4 bits in one memory cell), other flash memory modules, or other memory modules with the same characteristics.

Each of the memory cells in the rewritable non-volatile memory module 43 stores one or a plurality of bits via the change in voltage (also referred to as threshold voltage hereinafter). Specifically, a charge-trapping layer is disposed between the control gate and the channel of each of the memory cells. By applying a write voltage to the control gate, the number of electrons of the charge-trapping layer may be changed, and therefore the threshold voltage of the memory cells may be changed. This operation of changing the threshold voltage of the memory cells is also referred to as "writing data to the memory cells" or "programming the memory cells". As the threshold voltage is changed, each of the memory cells in the rewritable non-volatile memory module 43 has a plurality of storage statuses. Which storage status one memory cell belongs to may be determined via the application of a read voltage, so as to obtain one or a plurality of bits stored by the memory cell.

In an exemplary embodiment, the memory cells of the rewritable non-volatile memory module 43 may form a plurality of physical programming units, and these physical programming units may form a plurality of physical erasing units. Specifically, the memory cells on the same word line may form one or a plurality of physical programming units. If each of the memory cells may store 2 or more bits, the physical programming units on the same word line may be at least classified into lower physical programming units and upper physical programming units. For example, the least significant bit (LSB) of a memory cell belongs to the lower physical programming units, and the most significant bit (MSB) of a memory cell belongs to the upper physical programming units. Generally, in an MLC NAND-type flash memory, the write rate of the lower physical programming unit is greater than the write rate of the upper physical programming unit, and/or the reliability of the lower physical programming unit is greater than the reliability of the upper physical programming unit.

In an exemplary embodiment, the physical programming unit is the smallest unit of programming. That is, the physical programming unit is the smallest unit of data writing. For example, the physical programming unit may be a physical page or a physical sector. If the physical programming unit is a physical page, then the physical programming unit may include a data bit area and a redundancy bit area. The data bit area contains a plurality of physical sectors configured to store user data, and the redundancy bit area is configured to store system data (for example, management data such as an error correcting code). In an exemplary embodiment, the data bit area includes 32 physical sectors, and the size of one physical sector is 512 bytes (B). However, in other exemplary embodiments, the data bit area may also contain 8, 16, or a greater or lesser number of physical sectors, and the size of each of the physical sectors may also be greater or smaller. Moreover, the physical erasing unit is the smallest unit of erasing. That is, each of the physical erasing units contains the smallest number of memory cells erased together. For example, the physical erasing unit is a physical block.

Figure 5:
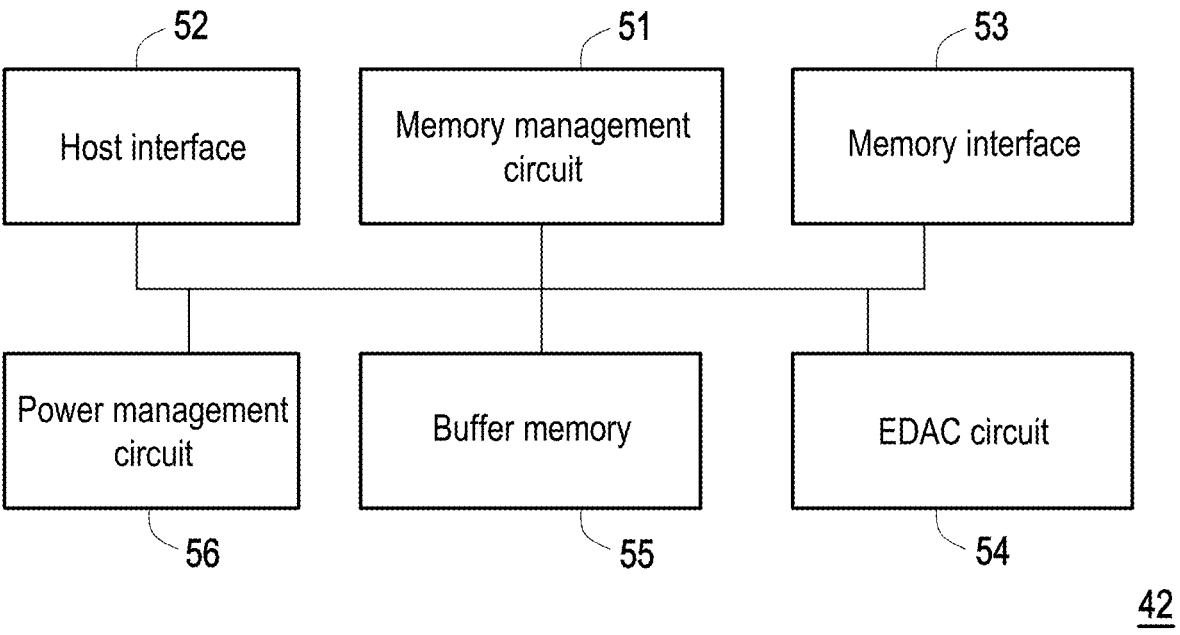
FIG. 5 is a schematic block diagram of a memory control circuit unit shown according to an exemplary embodiment of the invention.

FIG. 5 is a schematic block diagram of a memory control circuit unit shown according to an exemplary embodiment of the invention. Referring to FIG. 5, the memory control circuit unit 42 includes a memory management circuit 51, a host interface 52, and a memory interface 53.

The memory management circuit 51 is configured to control the overall operation of the memory control circuit unit 42. Specifically, the memory management circuit 51 has a plurality of control commands. During the operation of the memory storage device 10, the control commands are executed to perform operations such as writing, reading, and erasing data. In the following, descriptions relating to the operation of the memory management circuit 51 are equivalent to the descriptions of the operation of the memory control circuit unit 42.

In an exemplary embodiment, the control commands of the memory management circuit 51 are implemented in a firmware form. For example, the memory management circuit 51 has a microprocessor unit (not shown) and a read-only memory (not shown), and the control commands are burned into the ROM. During the operation of the memory storage device 10, the control commands are executed by the microprocessor unit to perform operations such as writing, reading, and erasing data.

In an exemplary embodiment, the control commands of the memory management circuit 51 may also be stored in a specific area of the rewritable non-volatile memory module 43 (for example, a system area dedicated to storing system data in the memory module) in the form of program codes. Moreover, the memory management circuit 51 has a microprocessor unit (not shown), a ROM (not shown), and a RAM (not shown). In particular, the ROM has a boot code, and when the memory control circuit unit 42 is enabled, the microprocessor unit first executes the boot code to load the control commands stored in the rewritable non-volatile memory module 43 into the RAM of the memory management circuit 51. Next, the microprocessor unit runs the control commands to perform operations such as writing, reading, and erasing data.

In an exemplary embodiment, the control commands of the memory management circuit 51 may also be implemented in a hardware form. For example, the memory management circuit 51 includes a microcontroller, a memory cell management circuit, a memory write circuit, a memory read circuit, a memory erase circuit, and a data processing circuit. The memory cell management circuit, the memory write circuit, the memory read circuit, the memory erase circuit, and the data processing circuit are coupled to the microcontroller. The memory cell management circuit is configured to manage memory cells or memory cell groups of the rewritable non-volatile memory module 43. The memory writing circuit is configured to issue a write command sequence to the rewritable non-volatile memory module 43 to write data into the rewritable non-volatile memory module 43. The memory read circuit is configured to issue a read command sequence to the rewritable non-volatile memory module 43 to read data from the rewritable non-volatile memory module 43. The memory erase circuit is configured to issue an erase command sequence to the rewritable non-volatile memory module 43 to erase data from the rewritable non-volatile memory module 43. The data processing circuit is configured to process the data to be written into the rewritable non-volatile memory module 43 and the data read from the rewritable non-volatile memory module 43. The write command sequence, the read command sequence, and the erase command sequence may independently include one or a plurality of program codes or command codes and be configured to instruct the rewritable non-volatile memory module 43 to perform corresponding operations such as writing, reading, and erasing. In an exemplary embodiment, the memory management circuit 51 may also issue other types of command sequences to the rewritable non-volatile memory module 43 to instruct the performance of corresponding operations.

The host interface 52 is coupled to the memory management circuit 51. The memory management circuit 51 may be communicated with the host system 11 via the host interface 52. The host interface 52 may be configured to obtain and identify commands and data of the host system 11. For example, the commands and data of the host system 11 may be sent to the memory management circuit 51 via the host interface 52. In addition, the memory management circuit 51 may send data to the host system 11 via the host interface 52. In the present exemplary embodiment, the host interface 52 is compatible with the PCI Express standard. However, it should be understood that the invention is not limited thereto, and the host interface 52 may also be compatible with the SATA standard, PATA standard, IEEE 1394 standard, USB standard, SD standard, UHS-I standard, UHS-II standard, MS standard, MMC standard, eMMC standard, UFS standard, CF standard, IDE standard, or other suitable standards for data transmission.

The memory interface 53 is coupled to the memory management circuit 51 and configured to access the rewritable non-volatile memory module 43. For example, the memory management circuit 51 may access the rewritable non-volatile memory module 43 via the memory interface 53. That is, the data to be written into the rewritable non-volatile memory module 43 is converted into a format acceptable to the rewritable non-volatile memory module 43 via the memory interface 53. Specifically, if the memory management circuit 51 is to access the rewritable non-volatile memory module 43, the memory interface 53 transmits the corresponding command sequence. For example, the command sequence may include a write command sequence instructing data writing, a read command sequence instructing data reading, an erase command sequence instructing data erasing, and corresponding command sequences configured to instruct various memory operations (such as changing read voltage level or performing a garbage collection (CC) operation). The command sequences are generated by, for example, the memory management circuit 51 and sent to the rewritable non-volatile memory module 43 via the memory interface 53. The command sequences may include one or a plurality of signals or data on a bus. These signals or data may include command codes or program codes. For example, information such as read identification code or memory address is included in a read command sequence.

In an exemplary embodiment, the memory control circuit unit 42 further includes an error detection and correction circuit 54, a buffer memory 55, and a power management circuit 56.

The error detection and correction circuit 54 is coupled to the memory management circuit 51 and configured to execute an error detection and correction operation to ensure the correctness of data. Specifically, when the memory management circuit 51 obtains a write command from the host system 11, the error detection and correction circuit 54 generates a corresponding error correcting code (ECC)

and/or error detecting code (EDC) for the data corresponding to the write command, and the memory management circuit 51 writes the data corresponding to the write command and the corresponding ECC and/or EDC into the rewritable non-volatile memory module 43. Next, when data is read from the rewritable non-volatile memory module 43, the memory management circuit 51 reads the ECC and/or the EDC corresponding to the data at the same time, and the error detection and correction circuit 54 executes an error detection and correction operation on the read data based on the ECC and/or the EDC.

The buffer memory 55 is coupled to the memory management circuit 51 and configured to temporarily store data. The power management circuit 56 is coupled to the memory management circuit 51 and configured to control the power of the memory storage device 10. The buffer memory 55 may be, for example, a static random-access memory (SRAM).

In an exemplary embodiment, the rewritable non-volatile memory module 43 of FIG. 4 may include a flash memory module. In an exemplary embodiment, the memory control circuit unit 42 of FIG. 4 may include a flash memory controller. In an exemplary embodiment, the memory management circuit 51 of FIG. 5 may include a flash memory management circuit.

In the present exemplary embodiment, the rewritable non-volatile memory module 43 includes a plurality of physical erasing units, and each of the physical erasing units includes a plurality of physical programming units. In particular, the memory management circuit 51 may combine several physical erasing units belonging to different memory physical planes of different memory dies (LUN) into one super physical erasing unit for operation (e.g., erasing, writing, or reading operation of data), and each super physical programming unit in the super physical erasing unit is composed of one of the physical programming units of each physical erasing unit.

Figure 6:
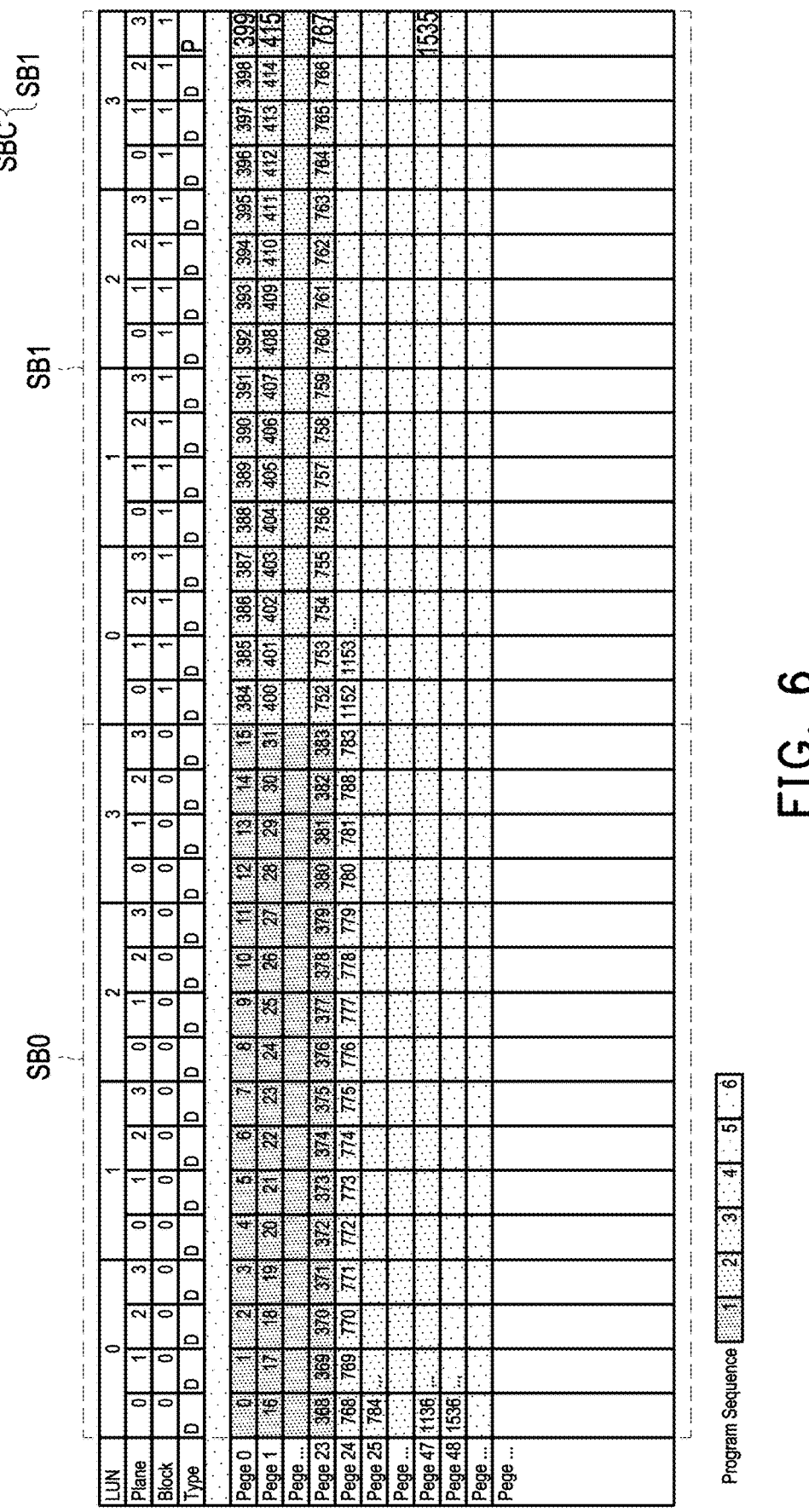
FIG. 6 is a schematic diagram of a super physical erasing unit shown according to an exemplary embodiment of the invention.

FIG. 6 is a schematic diagram of a super physical erasing unit shown according to an exemplary embodiment of the invention. Please refer to FIG. 6, taking the super physical erasing unit SB0 as an example, the memory management circuit 51 binds the first physical erasing unit (Block 0) in each memory physical plane (Planes 0 to 3) in each memory die (LUN 0 to 3) of the rewritable non-volatile memory module 43 into the super physical erasing unit SB0. Similarly, the memory management circuit 51 binds the second physical erasing unit (Block 1) in each memory physical plane (Planes 0 to 3) in each memory die (LUN 0 to 3) of the rewritable non-volatile memory module 43 into the super physical erasing unit SB1. A plurality of physical erasing units in the super physical erasing unit SB0 (or the super physical erasing unit SB1) formed by binding may be operated at the same time and do not necessarily need to be operated synchronously. For example, when the first physical erasing unit (Block 0) of the memory physical plane (Plane 0) of the memory die (LUN 0) is written, the first physical erasing unit (Block 0) of the memory physical plane (Plane 1) of the memory die (LUN 0) may also be written at the same time. In addition, the plurality of physical erasing units in the super physical erasing unit SB0 and the plurality of physical erasing units in the super physical erasing unit SB1 may not be operated at the same time.

In an exemplary embodiment, the memory management circuit 51 binds the super physical erasing unit SB0 and the next super physical erasing unit thereof (i.e., the super physical erasing unit SB1) into one combined super physical erasing unit SBC. In another exemplary embodiment, the memory management circuit 51 may bind any two super physical erasing units into one combined super physical erasing unit SBC. For example, the memory management circuit 51 may bind the super physical erasing unit SB0 and one super physical erasing unit bound by the third physical erasing unit (Block 2) in each memory physical plane (Planes 0 to 3) in each memory die (LUN 0 to 3) into one combined super physical erasing unit SBC.

In an exemplary embodiment, the memory management circuit 51 writes data (e.g., first data) into N super physical programming units of the super physical erasing unit SB0, wherein N is a positive integer. The program sequence 1 portion of FIG. 6 is taken as an example, wherein N is 24. The memory management circuit 51 writes the first data into the 24 physical programming units of each physical erasing unit in the super physical erasing unit SB0. For example, the memory management circuit 51 performs a cache program operation on the first 23 super physical programming units composed of the first 23 physical programming units in the 24 physical programming units of each physical erasing unit in the super physical erasing unit SB0 to write the first data into these 23 super physical programming units. For example, the memory management circuit 51 performs a normal program operation on the 24th super physical pro- gramming unit composed of the 24th physical programming unit in the 24 physical programming units of each physical erasing unit in the super physical erasing unit SB0 to write the first data into the 24th super physical programming unit.

In general, each physical plane (Planes 0 to 3) of the rewritable non-volatile memory module 43 has a cache register and a page register. When performing a program operation, the memory management circuit 51 transmits the write command sequence and the data to the rewritable non-volatile memory module 43. The rewritable non-vola- tile memory module 43 sequentially writes the data into the cache register and the page register, and then writes the data into the rewritable non-volatile memory module 43 to com- plete the program operation. After the data in the cache register is written into the page register, the rewritable non-volatile memory module 43 may clear the data in the cache register, obtain the next data from the memory man- agement circuit 51, and write the data into the cache register. The cooperation of these two registers may improve the write speed of the memory storage device 10. For example, in the case of a normal program operation, when data is written from the page register into the rewritable non- volatile memory module 43, although the data in the cache register is cleared, the rewritable non-volatile memory mod- ule 43 still has to wait until the data in the page register is completely written into the rewritable non-volatile memory module 43 before writing the next data into the cache register. For example, when the rewritable non-volatile memory module 43 performs a cache program operation, when data is written from the page register into the rewrit- able non-volatile memory module 43, the memory manage- ment circuit 51 may simultaneously write the next data into the cache register. Accordingly, the memory management circuit 51 adopts a method of performing a cache program operation to increase the write speed of the memory storage device 10 and effectively improve the performance of the memory storage device 10.

In the exemplary embodiment of FIG. 6, writing is performed sequentially according to the order in which the super physical programming units are arranged in the super physical erasing unit, such as writing sequentially from Page 0 to Page 23. In another exemplary embodiment, the memory management circuit 51 may specify writing in any order, for example, if Page 0 is not written, writing starts from Page 1.

In an example embodiment, data 0 to 15 are written into the same super physical programming unit Page 0 in the super physical erasing unit SB0. The memory management circuit 51 sequentially writes data 0 to 15 into each physical programming unit of the super physical programming unit Page 0 in the super physical erasing unit SB0. The memory management circuit 51 does not write data 0 to 15 into each physical programming unit of the super physical program- ming unit Page 0 in the super physical erasing unit SB0 at the same time.

In an exemplary embodiment, the memory management circuit 51 generates 24 first temporary parity codes accord- ing to the first data, and each temporary parity code corre- sponds to one super physical programming unit. For example, in the process of data 0 to 15 in the first data being sequentially written into the super physical programming unit Page 0 in the super physical erasing unit SB0, the memory management circuit 51 may sequentially perform an encoding operation (for example, an XOR operation) on data 0 to 15 to obtain the first temporary parity code corresponding to the super physical programming unit Page 0 in the super physical erasing unit SB0. For example, the memory management circuit 51 sequentially writes data 0 to 15 individually into each physical programming unit of the super physical programming unit Page 0 in the super physi- cal erasing unit SB0. That is, after completing the encoding operation of data 0, the memory management circuit 51 may first write data 0 into the super physical programming unit Page 0 in the super physical erasing unit SB0. In particular, the value of N is associated with the capacity of the buffer memory 55. Accordingly, the memory management circuit 51 may store the 24 first temporary parity codes in the buffer memory 55 to reduce the capacity of the rewritable non- volatile memory module 43 configured to store parity codes.

In an exemplary embodiment, the memory management circuit 51 writes data (e.g., second data) into M super physical programming units of the super physical erasing unit SB1, wherein M is a positive integer and M is equal to N. The program sequence 2 portion of FIG. 6 is taken as an example, wherein M is 24. The memory management circuit 51 writes the second data into the 24 physical programming units of each physical erasing unit in the super physical erasing unit SB1. For example, the memory management circuit 51 performs a cache program operation on the first 23 super physical programming units composed of the first 23 physical programming units in the 24 physical programming units of each physical erasing unit in the super physical erasing unit SB1 to write the second data into these 23 super physical programming units. For example, the memory management circuit 51 performs a normal program opera- tion on the 24th super physical programming unit composed of the 24th physical programming unit in the 24 physical programming units of each physical erasing unit in the super physical erasing unit SB1 to write the second data into the 24th super physical programming unit. The implementation details of the memory management circuit 51 performing the normal program operation and the cache program operation are described in detail in the above exemplary embodiments and are therefore not repeated here. The memory manage- ment circuit 51 adopts a method of performing a cache program operation to increase the write speed of the memory storage device 10 and effectively improve the performance of the memory storage device 10.

In an exemplary embodiment, the memory management circuit 51 obtains the 24 first temporary parity codes from the buffer memory 55 and performs an encoding operation (such as an XOR operation) on the second data expected to be written into the 24 super physical programming units in the super physical erasing unit SB1 and the 24 first temporary parity codes to generate 24 first parity codes. For example, in the process of data 384 to 398 being sequentially written into the super physical programming unit Page 0 in the super physical erasing unit SB1, the memory management circuit 51 may sequentially perform an encoding operation (for example, an XOR operation) on data 384 to 398 and the first temporary parity codes stored in the buffer memory 55 to obtain the first parity code corresponding to the super physical programming unit Page 0 in the super physical erasing unit SB1. For example, after completing the encoding operation of data 384 and the first temporary parity code and updating the first temporary parity code, the memory management circuit 51 may first write data 384 into the super physical programming unit Page 0 in the super physical erasing unit SB1. For example, after completing the encoding operation of data 398 and the updated first temporary parity code (the memory management circuit 51 calculates the first parity code), the memory management circuit 51 may write the calculated first parity code (i.e., data 399) into the super physical erasing unit SB1.

The implementation details of program sequence 2 to program sequence 4 are as described for program sequence 1 and program sequence 2, and are therefore not repeated here.

According to the above, by binding the super physical erasing unit SB0 and the super physical erasing unit SB1 into one combined super physical erasing unit SBC via the memory management circuit 51, the capacity of the rewritable non-volatile memory module 43 configured to store parity codes may be reduced (as shown in FIG. 6, Type D represents a super physical programming unit configured to store data, and Type P represents a super physical programming unit configured to store parity codes), and a super physical programming unit that may be configured to perform a cache program operation is added to improve the performance of the memory storage device 10.

Figure 7:
FIG. 7 is a schematic diagram of a super physical erasing unit shown according to an exemplary embodiment of the invention.

FIG. 7 is a schematic diagram of a super physical erasing unit shown according to an exemplary embodiment of the invention. Referring to FIG. 7, the memory management circuit 51 binds the super physical erasing unit SB0 and the next super physical erasing unit thereof (i.e., the super physical erasing unit SB1) into one distributed super physical erasing unit SBD. The memory management circuit 51 may also bind any two super physical erasing units, such as the super physical erasing units SB0 and SB2 into one distributed super physical erasing unit SBD.

In an exemplary embodiment, the memory management circuit 51 writes data (e.g., first data) into N super physical programming units of the super physical erasing unit SB0, wherein N is a positive integer. The program sequence 1 portion of FIG. 7 is taken as an example, wherein N is 24. The memory management circuit 51 writes the first data into the 24 physical programming units of each physical erasing unit in the super physical erasing unit SB0. For example, the memory management circuit 51 performs a cache program operation on the first 23 super physical programming units composed of the first 23 physical programming units in the 24 physical programming units of each physical erasing unit in the super physical erasing unit SB0 to write the first data into these 23 super physical programming units. For example, the memory management circuit 51 performs a normal program operation on the 24th super physical programming unit composed of the 24th physical programming unit in the 24 physical programming units of each physical erasing unit in the super physical erasing unit SB0 to write the first data into the 24th super physical programming unit. The implementation details of the memory management circuit 51 performing the normal program operation and the cache program operation are described in detail in the above exemplary embodiments and are therefore not repeated here. The memory management circuit 51 adopts a method of performing a cache program operation to increase the write speed of the memory storage device 10 and effectively improve the performance of the memory storage device 10.

In an exemplary embodiment, the memory management circuit 51 generates 24 first temporary parity codes according to the first data. The implementation details of the memory management circuit 51 generating the first temporary parity codes are described in detail in the above exemplary embodiments and are therefore not repeated here. In particular, the value of N is associated with the capacity of the buffer memory 55. Accordingly, the memory management circuit 51 may store the 24 first temporary parity codes in the buffer memory 55 to reduce the capacity of the rewritable non-volatile memory module 43 configured to store parity codes.

In an exemplary embodiment, the memory management circuit 51 writes data (e.g., second data) into M super physical programming units of the super physical erasing unit SB1, wherein M is a positive integer and M is greater than N. The program sequence 2 portion of FIG. 7 is taken as an example, wherein M is 48. The memory management circuit 51 writes the second data into the 48 physical programming units of each physical erasing unit in the super physical erasing unit SB1. For example, the memory management circuit 51 performs a cache program operation on the first 47 super physical programming units composed of the first 47 physical programming units in the 48 physical programming units in each physical erasing unit in the super physical erasing unit SB1 to write the second data into these 47 super physical programming units. For example, the memory management circuit 51 performs a normal program operation on the 48th super physical programming unit composed of the 48th physical programming unit in the 48 physical programming units in each physical erasing unit in the super physical erasing unit SB1 to write the second data into the 48th super physical programming unit. The implementation details of the memory management circuit 51 performing the normal program operation and the cache program operation are described in detail in the above exemplary embodiments and are therefore not repeated here. The memory management circuit 51 adopts a method of performing a cache program operation to increase the write speed of the memory storage device 10 and effectively improve the performance of the memory storage device 10.

In an exemplary embodiment, the memory management circuit 51 obtains the 24 first temporary parity codes from the buffer memory 55 and performs an encoding operation on the second data expected to be written into the 24 super physical programming units in the super physical erasing unit SB1 and the 24 first temporary parity codes to generate 24 first parity codes, and stores the 24 first parity codes in the second super physical erasing unit SB1. Moreover, the memory management circuit 51 generates M–N (i.e., 24) second temporary parity codes according to the second data expected to be written into the other 24 super physical programming units in the super physical erasing unit SB1. The implementation details of the memory management circuit 51 generating the temporary parity codes and the parity codes are described in the above exemplary embodiments and are therefore not repeated here.

In an exemplary embodiment, the memory management circuit 51 stores the 24 second temporary parity codes in the buffer memory 55 to reduce the capacity of the rewritable non-volatile memory module 43 configured to store parity codes. In particular, the value of M–N is associated with the capacity of the buffer memory 55.

In an exemplary embodiment, the memory management circuit 51 writes data (e.g., third data) into the (N+1)th to (N+Y)th super physical programming units of the first super physical erasing unit SB0, wherein Y is a positive integer and N+Y is greater than or equal to M. The program sequence 3 portion of FIG. 7 is taken as an example, wherein N+1 is equal to 25, and N+Y is equal to 48. For example, the memory management circuit 51 performs a cache program operation on the 25th super physical programming unit to the 47th super physical programming unit in the super physical erasing unit SB0 to write the third data into the 25th to 47th super physical programming units in the super physical erasing unit SB0. For example, the memory management circuit 51 performs a normal program operation on the 48th super physical programming unit in the super physical erasing unit SB0 to write the third data into the 48th super physical programming unit in the super physical erasing unit SB0. The implementation details of the memory management circuit 51 performing the normal program operation and the cache program operation are described in detail in the above exemplary embodiments and are therefore not repeated here. The memory management circuit 51 adopts a method of performing a cache program operation to increase the write speed of the memory storage device 10 and effectively improve the performance of the memory storage device 10.

In an exemplary embodiment, the memory management circuit 51 performs an encoding operation on the third data expected to be written into the 25th super physical programming unit to the 48th super physical programming unit in the super physical erasing unit SB0 and the 24 second temporary parity codes to generate 24 second parity codes. The implementation details of the memory management circuit 51 generating the parity codes are described in the above exemplary embodiments and are therefore not repeated here. The memory management circuit 51 stores the 24 second parity codes in the super physical erasing unit SB0.

The implementation details of program sequence 4 to program sequence 6 are as described for program sequence 2 and program sequence 3, and are therefore not repeated here.

According to the above, by binding the super physical erasing unit SB0 and the super physical erasing unit SB1 into one distributed super physical erasing unit SBD via the memory management circuit 51, the capacity of the rewritable non-volatile memory module 43 configured to store parity codes may be reduced (as shown in FIG. 7, Type D represents a super physical programming unit configured to store data, Type P represents a super physical programming unit configured to store parity codes, Type P/D represents a super physical programming unit configured to store data or parity codes), and a super physical programming unit that may be configured to perform a cache program operation is added to improve the performance of the memory storage device 10.

FIG. 8 is a flowchart of a memory management method shown according to an exemplary embodiment of the invention. Referring to FIG. 8, in step S801, a cache program operation is performed on first N–1 super physical programming units in N super physical programming units of a first super physical erasing unit to write first data into the first N–1 super physical programming units. In step S802, a normal program operation is performed on an N-th super physical programming unit in the N super physical programming units of the first super physical erasing unit to write the first data into the N-th super physical programming unit. In step S803, N first temporary parity codes are generated according to the first data and the N first temporary parity codes are stored in a buffer memory. In step S804, a cache program operation is performed on first M–1 super physical programming units in M super physical programming units of a second super physical erasing unit to write second data into the first M–1 super physical programming units, wherein M is equal to N. In step S805, a normal program operation is performed on an M-th super physical programming unit in M super physical programming units of a second super physical erasing unit to write the second data into the M-th super physical programming unit. In step S806, an encoding operation is performed on the second data and the N first temporary parity codes to generate N first parity codes. In step S807, the N first parity codes are written into the second super physical erasing unit.

FIG. 9 is a flowchart of a memory management method shown according to an exemplary embodiment of the invention. Referring to FIG. 9, in step S901, a cache program operation is performed on first N–1 super physical programming units in N super physical programming units of a first super physical erasing unit to write first data into the first N–1 super physical programming units. In step S902, a normal program operation is performed on an N-th super physical programming unit in the N super physical programming units of the first super physical erasing unit to write the first data into the N-th super physical programming unit. In step S903, N first temporary parity codes are generated according to the first data and the N first temporary parity codes are stored in a buffer memory. In step S904, a cache program operation is performed on first M–1 super physical programming units in M super physical programming units of a second super physical erasing unit to write second data into the first M–1 super physical programming units, wherein M is greater than N. In step S905, a normal program operation is performed on an M-th super physical programming unit in the M super physical programming units of the second super physical erasing unit to write the second data into the M-th super physical programming unit. In step S906, an encoding operation is performed on the second data and the N first temporary parity codes to generate N first parity codes, and M–N second temporary parity codes are generated according to the second data. In step S907, the N first parity codes are written into the second super physical erasing unit and the M–N second temporary parity codes are stored in the buffer memory. In step S908, third data is written into (N+1)th to (N+Y)th super physical programming units of the first super physical erasing unit, wherein Y is a positive integer and N+Y is greater than or equal to M. In step S909, an encoding operation is performed on the third data and the M–N second temporary parity codes to generate M–N second parity codes. In step S910, the M–N second parity codes are written into the first super physical erasing unit.

Figure 10:
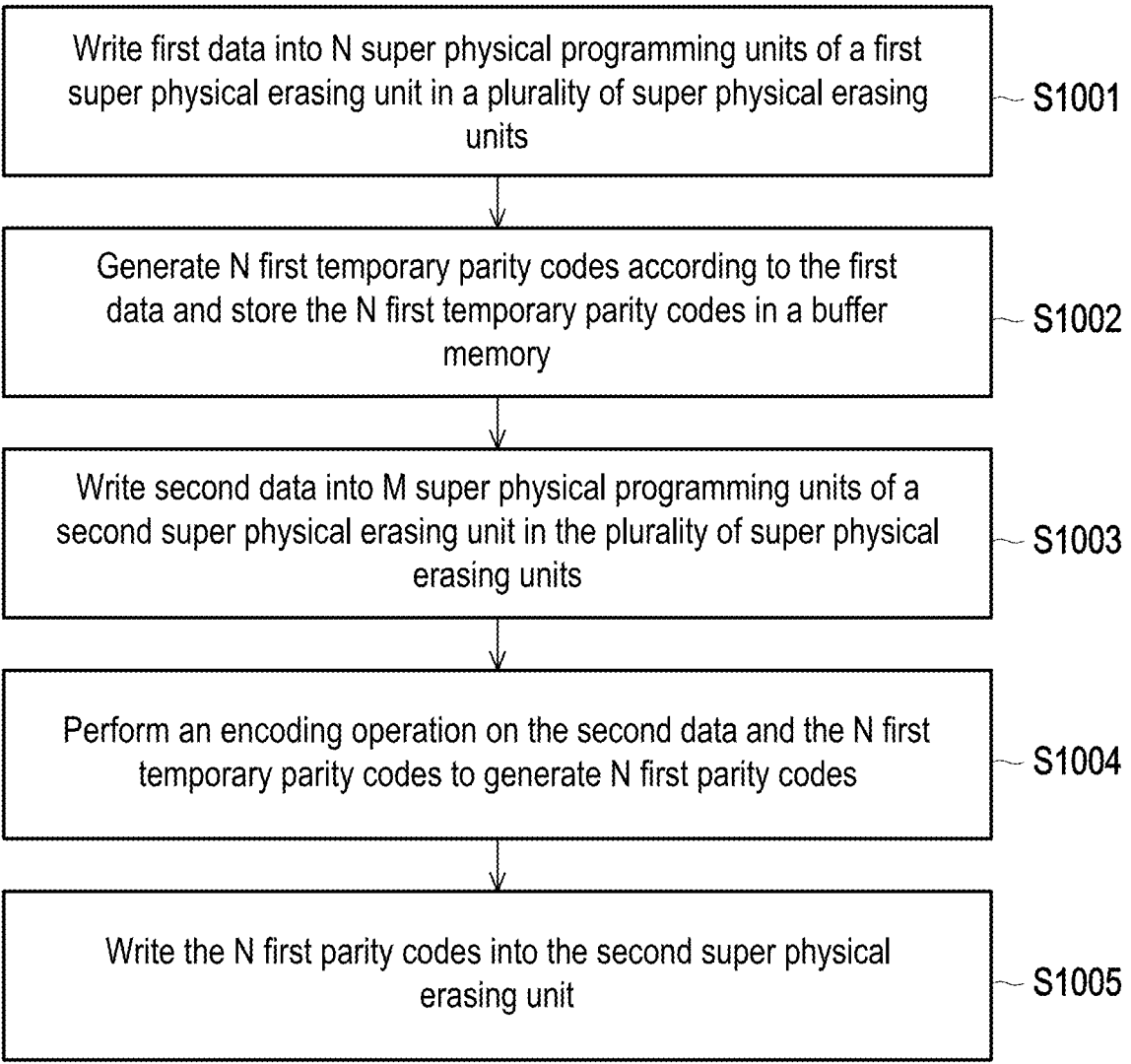
FIG. 10 is a flowchart of a memory management method shown according to an exemplary embodiment of the invention.

FIG. 10 is a flowchart of a memory management method shown according to an exemplary embodiment of the invention. Referring to FIG. 10, in step S1001, first data is written into N super physical programming units of a first super physical erasing unit in a plurality of super physical erasing units. In step S1002, N first temporary parity codes are generated according to the first data and the N first temporary parity codes are stored in a buffer memory. In step S1003, second data is written into M super physical programming units of a second super physical erasing unit in the plurality of super physical erasing units. In step S1004, an encoding operation is performed on the second data and the N first temporary parity codes to generate N first parity codes. In step S1005, the N first parity codes are written into the second super physical erasing unit.

Each step in FIG. 8 to FIG. 10 is described in detail above and is therefore not repeated here. It should be mentioned that, each step in FIG. 8 to FIG. 10 may be implemented as a plurality of program codes or circuits, and the invention is not limited thereto. Moreover, the method of FIG. 8 to FIG. 10 may be used with the above exemplary embodiments, and may also be used alone, and the invention is not limited thereto.

Based on the above, the memory management method, the memory storage device, and the memory control circuit unit of the invention reduce the capacity of the rewritable non-volatile memory module configured to store parity codes by temporarily storing the parity codes in the buffer memory, and increase the range of cache program operation that may be used in the super physical erasing unit to improve the performance of the memory storage device.

Although the invention has been described with reference to the above embodiments, it will be apparent to one of ordinary skill in the art that modifications to the described embodiments may be made without departing from the spirit of the invention. Accordingly, the scope of the invention is defined by the attached claims not by the above detailed descriptions.

What is claimed is:

1. A memory management method, configured for a rewritable non-volatile memory module, wherein the rewritable non-volatile memory module comprises a plurality of super physical erasing units, and the memory management method comprises:

performing a normal program operation and a cache program operation to write first data into N super physical programming units of a first super physical erasing unit in the super physical erasing units;

generating N first temporary parity codes according to the first data and storing the N first temporary parity codes in a buffer memory;

performing the normal program operation and the cache program operation to write second data into M super physical programming units of a second super physical erasing unit in the super physical erasing units;

performing an encoding operation on the second data and the N first temporary parity codes to generate N first parity codes; and writing the N first parity codes into the second super physical erasing unit, wherein the step of performing the normal program operation and the cache program operation to write the first data into the N super physical programming units of the first super physical erasing unit in the super physical erasing units comprises:

performing the cache program operation on first N−1 super physical programming units in the N super physical programming units to write the first data into the first N−1 super physical programming units; and performing the normal program operation on an N-th super physical programming unit in the N super physical programming units to write the first data into the N-th super physical programming unit.

2. The memory management method of claim 1, wherein N and M are positive integers and M is equal to N.

3. The memory management method of claim 1, wherein N and M are positive integers and M is greater than N.

4. The memory management method of claim 3, further comprising:

generating M−N second temporary parity codes according to the second data and storing the M−N second temporary parity codes in the buffer memory, wherein M−N is a difference between M and N.

5. The memory management method of claim 4, further comprising:

writing third data into (N+1)th to (N+Y)th super physical programming units of the first super physical erasing unit, wherein Y is a positive integer and N+Y is greater than or equal to M;

performing an encoding operation on the third data and the M−N second temporary parity codes to generate M−N second parity codes; and writing the M−N second parity codes into the first super physical erasing unit.

6. The memory management method of claim 1, wherein values of N and M are associated with a capacity of the buffer memory.

7. The memory management method of claim 1, wherein the step of performing the normal program operation and the cache program operation to write the second data into the M super physical programming units of the second super physical erasing unit in the super physical erasing units comprises:

performing the cache program operation on first M−1 super physical programming units in the M super physical programming units to write the second data into the first M−1 super physical programming units; and performing the normal program operation on an M-th super physical programming unit in the M super physical programming units to write the second data into the M-th super physical programming unit.

8. A memory storage device, comprising:

a connection interface unit configured to be coupled to a host system;

a rewritable non-volatile memory module comprising a plurality of super physical erasing units;

a memory control circuit unit coupled to the connection interface unit and the rewritable non-volatile memory module, wherein the memory control circuit unit is configured to:

perform a normal program operation and a cache program operation to write first data into N super physical programming units of a first super physical erasing unit in the super physical erasing units;

generate N first temporary parity codes according to the first data and store the N first temporary parity codes in a buffer memory;

perform the normal program operation and the cache program operation to write second data into M super physical programming units of a second super physical erasing unit in the super physical erasing units;

perform an encoding operation on the second data and the N first temporary parity codes to generate N first parity codes; and write the N first parity codes into the second super physical erasing unit, wherein the operation of the memory control circuit unit performing the normal program operation and the cache program operation to write the first data into the N super physical programming units of the first super physical erasing unit in the super physical erasing units comprises:

performing the cache program operation on first N−1 super physical programming units in the N super physical programming units to write the first data into the first N−1 super physical programming units; and performing the normal program operation on an N-th super physical programming unit in the N super physical programming units to write the first data into the N-th super physical programming unit.

9. The memory storage device of claim 8, wherein N and M are positive integers and M is equal to N.

10. The memory storage device of claim 8, wherein N and M are positive integers and M is greater than N.

11. The memory storage device of claim 10, wherein the memory control circuit unit is further configured to:

generate M−N second temporary parity codes according to the second data and store the M−N second temporary parity codes in the buffer memory, wherein M−N is a difference between M and N.

12. The memory storage device of claim 11, wherein the memory control circuit unit is further configured to:

write third data into (N+1)th to (N+Y)th super physical programming units of the first super physical erasing unit, wherein Y is a positive integer and N+Y is greater than or equal to M;

perform an encoding operation on the third data and the M−N second temporary parity codes to generate M−N second parity codes; and write the M−N second parity codes into the first super physical erasing unit.

13. The memory storage device of claim 8, wherein values of N and M are associated with a capacity of the buffer memory.

14. The memory storage device of claim 8, wherein the operation of the memory control circuit unit performing the normal program operation and the cache program operation to write the second data into the M super physical programming units of the second super physical erasing unit in the super physical erasing units comprises:

performing the cache program operation on first M−1 super physical programming units in the M super physical programming units to write the second data into the first M−1 super physical programming units; and performing the normal program operation on an M-th super physical programming unit in the M super physical programming units to write the second data into the M-th super physical programming unit.

15. A memory control circuit unit, configured to control a rewritable non-volatile memory module, wherein the rewritable non-volatile memory module comprises a plurality of super physical erasing units, and the memory control circuit unit comprises:

a host interface coupled to a host system;

a memory interface coupled to the rewritable non-volatile memory module;

a memory management circuit coupled to the host interface and the memory interface; and a buffer memory coupled to the memory management circuit, wherein the memory management circuit is configured to:

perform a normal program operation and a cache program operation to write first data into N super physical programming units of a first super physical erasing unit in the super physical erasing units;

generate N first temporary parity codes according to the first data and store the N first temporary parity codes in the buffer memory;

perform the normal program operation and the cache program operation to write second data into M super physical programming units of a second super physical erasing unit in the super physical erasing units;

perform an encoding operation on the second data and the N first temporary parity codes to generate N first parity codes; and write the N first parity codes into the second super physical erasing unit, wherein the operation of the memory management circuit performing the normal program operation and the cache program operation to write the first data into the N super physical programming units of the first super physical erasing unit in the super physical erasing units comprises:

performing the cache program operation on first N−1 super physical programming units in the N super physical programming units to write the first data into the first N−1 super physical programming units; and performing the normal program operation on an N-th super physical programming unit in the N super physical programming units to write the first data into the N-th super physical programming unit.

16. The memory control circuit unit of claim 15, wherein N and M are positive integers and M is equal to N.

17. The memory control circuit unit of claim 15, wherein N and M are positive integers and M is greater than N.

18. The memory control circuit unit of claim 17, wherein the memory management circuit is further configured to:

generate M−N second temporary parity codes according to the second data and store the M−N second temporary parity codes in the buffer memory, wherein M−N is a difference between M and N.

19. The memory control circuit unit of claim 18, wherein the memory management circuit is further configured to:

write third data into (N+1)th to (N+Y)th super physical programming units of the first super physical erasing unit, wherein Y is a positive integer and N+Y is greater than or equal to M;

perform an encoding operation on the third data and the M−N second temporary parity codes to generate M−N second parity codes; and write the M−N second parity codes into the first super physical erasing unit.

20. The memory control circuit unit of claim 15, wherein values of N and M are associated with a capacity of the buffer memory.

21. The memory control circuit unit of claim 15, wherein the operation of the memory management circuit performing the normal program operation and the cache program operation to write the second data into the M super physical programming units of the second super physical erasing unit in the super physical erasing units comprises:

performing the cache program operation on first M−1 super physical programming units in the M super physical programming units to write the second data into the first M−1 super physical programming units; and performing the normal program operation on an M-th super physical programming unit in the M super physical programming units to write the second data into the M-th super physical programming unit.

* * * * *